(12) United States Patent
Barbu et al.

(10) Patent No.: US 11,109,387 B2
(45) Date of Patent: Aug. 31, 2021

(54) INTERFERENCE MANAGEMENT

(71) Applicant: Nokia Technologies Oy, Espoo (FI)

(72) Inventors: Oana-Elena Barbu, Aalborg (DK); Klaus Ingemann Pedersen, Aalborg (DK); Benny Vejlgaard, Gistrup (DK); Johannes Harrebek, Aalborg (DK); Youngsoo Yuk, Seoul (KR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/780,485

(22) Filed: Feb. 3, 2020

(65) Prior Publication Data
US 2020/0267738 A1 Aug. 20, 2020

Related U.S. Application Data

(60) Provisional application No. 62/806,105, filed on Feb. 15, 2019.

(51) Int. Cl.
*H04W 36/18* (2009.01)
*H04W 48/16* (2009.01)
(Continued)

(52) U.S. Cl.
CPC ......... *H04W 72/082* (2013.01); *H04L 5/0073* (2013.01); *H04W 4/029* (2018.02);
(Continued)

(58) Field of Classification Search
CPC ..... H04W 69/00; H04W 69/03; H04W 72/02; H04W 36/18; H04W 36/0055;
(Continued)

(56) References Cited

U.S. PATENT DOCUMENTS 5,754,626 A * 5/1998 Otonari ................ H04B 7/2681
370/321
6,435,020 B1 * 8/2002 Oldenettel .......... B60C 23/0416
340/445
(Continued)

FOREIGN PATENT DOCUMENTS

JP 6707552 B2 * 2/2016
JP 6707552 B2 * 6/2020

OTHER PUBLICATIONS

Method and Apparatus for Mobile Identity Authentication An IP.com Prior Art Database Technical Disclosure Authors: Disclosed Anonymously Mar. 2010 (Year: 2010).*

(Continued)

*Primary Examiner* — William D Cumming
(74) *Attorney, Agent, or Firm* — Squire Patton Boggs (US) LLP

(57) ABSTRACT

A method for identifying potentially interfering devices is provided. The method may include receiving, by a first base station, an information element comprising information for identifying location of a first device with respect to the first base station, and sending a request to a second base station. The request may include location information on the basis of the received information element. The method may include receiving, in response to the request, an identifier of at least one further device, and transmitting the identifier of the at least one further device to the first device for interference measurements.

20 Claims, 14 Drawing Sheets

(51) Int. Cl.
*H04W 76/18* (2018.01)
*H04W 4/029* (2018.01)
*H04W 72/08* (2009.01)
*H04W 76/11* (2018.01)
*H04L 5/00* (2006.01)
*H04W 64/00* (2009.01)
*H04W 24/10* (2009.01)

(52) U.S. Cl.
CPC ......... *H04W 24/10* (2013.01); *H04W 64/003* (2013.01); *H04W 76/11* (2018.02)

(58) Field of Classification Search
CPC ........... H04W 36/0061; H04W 64/003; H04W 64/00; H04W 48/16; H04W 76/18; H04W 4/029
USPC .......................... 455/456.1, 435.1, 437, 561
See application file for complete search history.

(56) References Cited

U.S. PATENT DOCUMENTS

| | | | | |
|---|---|---|---|---|
| 7,047,009 | B2* | 5/2006 | Laroia | H04W 36/18 455/437 |
| 8,768,415 | B2* | 7/2014 | Anbe | H04W 64/003 455/561 |
| 9,121,921 | B2* | 9/2015 | Lee | H04W 4/029 |
| 9,467,931 | B2* | 10/2016 | Cho | H04W 48/16 |
| 9,526,057 | B2* | 12/2016 | Yi | H04W 36/0069 |
| 9,603,111 | B2* | 3/2017 | Harada | H04W 48/10 |
| 9,699,760 | B2* | 7/2017 | Cui | G01S 5/10 |
| 9,763,147 | B2* | 9/2017 | Taneja | H04B 17/318 |
| 10,321,365 | B2* | 6/2019 | Taneja | H04W 36/14 |
| 10,390,325 | B2* | 8/2019 | Li | H04W 64/00 |
| 2012/0149372 | A1* | 6/2012 | Lee | G01S 5/0263 455/435.1 |
| 2013/0196713 | A1* | 8/2013 | Anbe | H04W 64/003 455/561 |
| 2014/0016590 | A1* | 1/2014 | Cho | H04W 48/16 370/329 |
| 2015/0052255 | A1* | 2/2015 | Sun | H04W 76/18 709/227 |
| 2015/0146692 | A1* | 5/2015 | Yi | H04W 36/0055 370/331 |
| 2015/0208310 | A1* | 7/2015 | Taneja | H04W 36/0061 370/331 |
| 2015/0319731 | A1* | 11/2015 | Cui | H04W 64/00 455/456.1 |
| 2016/0088511 | A1* | 3/2016 | Nguyen | H04B 10/1129 398/115 |
| 2016/0088579 | A1* | 3/2016 | Harada | H04W 48/16 370/336 |
| 2017/0289949 | A1* | 10/2017 | Cui | H04W 64/00 |
| 2017/0303231 | A1* | 10/2017 | Li | H04W 64/00 |
| 2017/0367016 | A1* | 12/2017 | Taneja | H04L 63/029 |
| 2019/0165894 | A1* | 5/2019 | Choi | H04B 17/24 |
| 2020/0235867 | A1* | 7/2020 | Choi | H04L 1/1812 |
| 2020/0267738 | A1* | 8/2020 | Barbu | H04W 24/10 |
| 2020/0288436 | A1* | 9/2020 | Byun | H04L 5/0091 |

OTHER PUBLICATIONS 802.22-2011—IEEE Standard for Information technology—Local and metropolitan area networks—Specific requirements—Part 22: Cognitive Wireless RAN Medium Access Control (MAC) and Physical Layer (PHY) specifications: Policies and procedures for operation in the TV Bands Publisher: IEEE Jul. 2011 (Year: 2011).*
"New WID on Cross Link Interference (CLI) handling and Remote Interference Management (RIM) for NR", 3GPP TSG RAN Meeting #80, RP-181431, Agenda : 9.1.7, LG Electronics, Jun. 11-15, 2018, 5 pages.
"3rd Generation Partnership Project; Technical Specification Group Radio Access Network; NG-RAN; Architecture description (Release 15)", 3GPP TS 38.401, V15.1.0, Mar. 2018, pp. 1-23.
Pedersen et al., "A Flexible 5G Wide Area Solution for TDD with Asymmetric Link Operation", IEEE Wireless Communications, vol. 24, Issue—2, Apr. 2017, pp. 122-128.
Lukowa et al., "Performance of strong interference cancellation in flexible UL/DL TDD systems using coordinated muting, scheduling and rate allocation", IEEE Wireless Communications and Networking Conference, Apr. 3-6, 2016, 7 pages.
Huo et al., "Joint user scheduling and transceiver design for cross-link interference suppression in MU-MIMO dynamic TDD systems", 3rd IEEE International Conference on Computer and Communications (ICCC), Dec. 13-16, 2017, pp. 962-967.
Guo et al., "Dynamic TDD and Interference Management towards 5G", IEEE Wireless Communications and Networking Conference (WCNC), Apr. 15-18, 2018, 6 pages.
"Dynamic TDD Interference Mitigation Concepts in NR", 3GPP TSG RAN WG1#88, R1-1703110, Agenda : 8.1.6.2, Nokia, Feb. 13-17, 2017, 6 pages.
"Cross-link interference management based on coordinated beamforming", 3GPP TSG RAN WG1 meeting #88, R1-1703008, Agenda : 8.1.6.2, Samsung, Feb. 13-17, 2017, pp. 1-8.
"3rd Generation Partnership Project; Technical Specification Group Radio Access Network; NG-RAN; Xn application protocol (XnAP) (Release 15)", 3GPP TS 38.423, V15.2.0, Dec. 2018, pp. 1-281.
"3rd Generation Partnership Project; Technical Specification Group Radio Access Network; NG-RAN; F1 general aspects and principles (Release 15)", 3GPP TS 38.470, V15.4.0, Dec. 2018, pp. 1-13.
"3rd Generation Partnership Project; Technical Specification Group Radio Access Network; NG-RAN; F1 application protocol (F1AP) (Release 15)", 3GPP TS 38.473, V15.4.1, Jan. 2019, pp. 1-192.
"3rd Generation Partnership Project;Technical Specification Group Radio Access Network; NR;Radio Resource Control (RRC) protocol specification(Release 15)", 3GPP TS 38.331, V15.4.0, Dec. 2018, pp. 1-474.
Patent Cooperation Treaty Application No. PCT/EP2019/053104, "Interference Management", filed on Feb. 8, 2019, 23 pages.
Patent Cooperation Treaty Application No. PCT/CN2018/101885, "Detection of Cross-Link Interference Between Terminal Devices", filed on Aug. 23, 2018, 20 pages.

* cited by examiner $$TA_{xU_{min}} = TA_{UU} - \Delta \quad TA_{xI_{min}} = TA_{UI} - \Delta$$
$$TA_{xU_{max}} = TA_{UU} + \Delta \quad TA_{xI_{max}} = TA_{UI} + \Delta$$

$$TA_{xI_{min}} = TA_{UI} - \Delta$$
$$TA_{xI_{max}} = TA_{UI} + \Delta$$

INTERFERENCE MANAGEMENT

RELATED APPLICATIONS

The present application claims priority from provisional application No. 62/806,105, filed Feb. 15, 2019.

FIELD

The present disclosure relates to management of interference in cellular communication networks, and in particular for identifying potentially interfering devices.

BACKGROUND

Cellular wireless communication takes place over wireless links, in cells of a cellular communication network. Uplink and downlink communication, being directed toward a base station and toward a mobile terminal, respectively, may be separated from each other such that these communications do not interfere with each other.

The uplink and the downlink may be separated from each other by placing them at different frequencies, a technique known as frequency division duplexing, FDD. On the other hand the uplink and the downlink may be communicated over the same frequency band, but in this case, the frequency band is divided in the time domain such that interference is avoided. In this case, the frequency band is divided in the time domain, such that it is not used at the same time for uplink and downlink. This technique is known as time division duplex, TDD. A network may dynamically switch between uplink (UL) and downlink (DL) in a TDD mode on a per-cell basis. A base station may thus switch between UL and DL independently of its neighbours, to accommodate its own network loads.

SUMMARY

According to some aspects, there is provided the subject-matter of the independent claims. Some example embodiments are defined in the dependent claims.

According to a first aspect of the present disclosure, there is provided a method, comprising receiving, by a first base station, an information element comprising information for identifying location of a first device at least with respect to the first base station; sending a request to a second base station, the request comprising location information on the basis of the received information element; receiving, in response to the request, an identifier of at least one further device; and transmitting, the identifier of the at least one further device to the first device for interference measurements.

According to a second aspect of the present disclosure, there is provided a method comprising: transmitting, by a first device, to a first base station, an information element comprising information for identifying location of the first device at least with respect to the first base station; and receiving, in response to the transmitted information and for interference measurements, an identifier of the at least one further device.

According to a third aspect of the present disclosure, there is provided a method comprising: receiving, by a second base station from a first base station, a request comprising location information related to a first device associated to the first base station; identifying, in response to the received request, at least one further device located in a proximity to the first device; and transmitting an identifier of the at least one further device to the first base station for interference measurements by the first device.

According to some further aspects of the present disclosure, there are provided a system, apparatuses, computer programs, and computer readable mediums adapted to perform the method according to any one of the aspects or an embodiment thereof.

EMBODIMENTS

Figure 1:
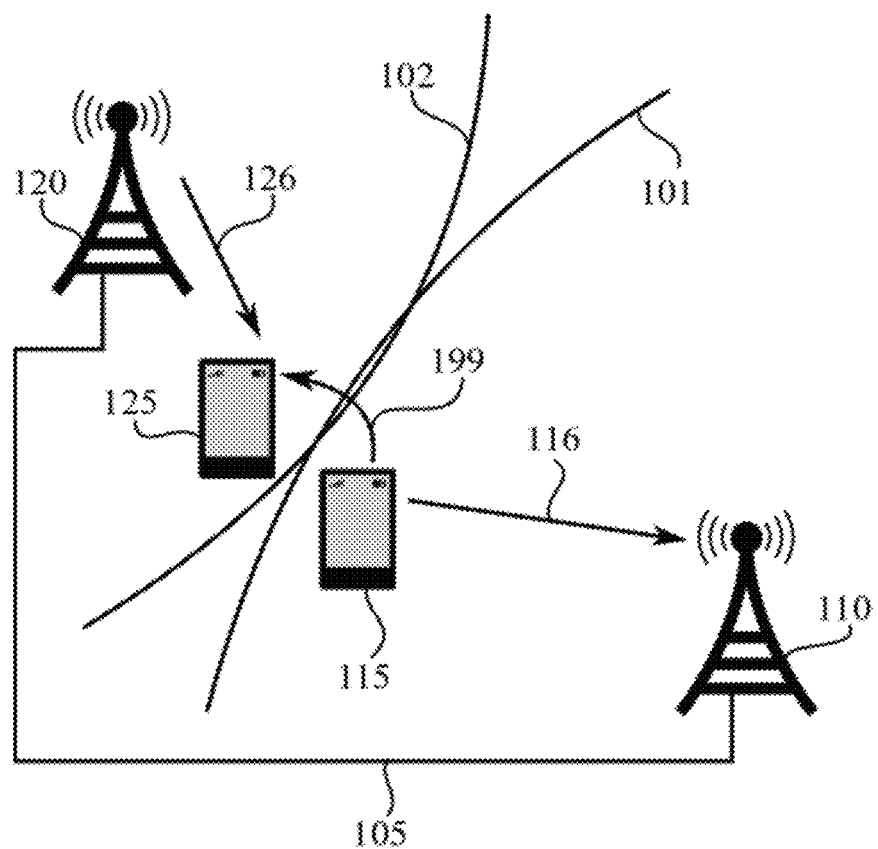
FIG. 1 illustrates an example system in accordance with at least some embodiments.

FIG. 1 illustrates an example system in accordance with at least some example embodiments of the present invention.

The example system comprises base stations 110 and 120, which may each comprise, for example, a fifth generation, 5G, also known as new radio, NR, base station which is also referred to as a gNB. Alternatively, the base stations may be configured to operate in accordance with another kind of cellular communications technology, such as, for example, wireless code division multiple access, WCDMA, for example. The base stations do not strictly need to be of the same type in the sense that one of them may be configured to operate in accordance with a first ratio access technology, RAT, and the other may be configured to operate in accordance with another RAT.

The base stations 110 and 120 are enabled to communicate with each other, either via an inter-base station link 105, or via a radio access network, RAN, control node or core network. Examples of inter-base station links include an X2 interface and an Xn interface, depending on the technology used in the base stations themselves.

In some example embodiments, at least one of the base stations is distributed in the sense that it comprises a centralized unit, CU, and one or more distributed units, DU. An F1 interface may be arranged between the CU and DUs. The DUs may be operated to control cross-link interference in a way that is analogous with the process described herein in detail with reference to two base stations. As such, a neighbouring base station device which is informed of the scheduling plan may be a neighbouring base station, or a neighbouring DU.

A cell edge of a cell controlled by base station 110 is indicated in FIG. 1 schematically as edge 101. Likewise, a cell edge a cell controlled by base station 120 is indicated in FIG. 1 as edge 102. A user device, which may be referred to as user equipment (UE) as below 115 served by base station 110 is disposed near cell edge 101, and likewise a UE 125 served by base station 120 is disposed near cell edge 102. Thus both UEs are in their respective cells, near the cell edge, and also fairly close to each other since the cells are adjacent. A UE served by a particular base station is considered to be associated with that base station. Where cells are small in size, relatively more of the UEs will be located near the edge. 5G technology, for example, may be associated with smaller cells than older cellular technologies.

To optimize the bandwidth utilization, 5G NR systems operate in TDD mode, by dynamically switching between UL and DL on a per-cell basis. In the illustrated situation, both UEs 115, 125 have been configured to use TDD, in detail, UE 115 transmits in the uplink 116 at the same time, using the same resources as UE 125 uses to receive in its downlink 126. Since the UEs are close to each other, UE 125 may receive the transmission of UE 115 as cross-link interference (CLI) 199, which may cause substantial deterioration in communication quality of downlink 126 and make flexible TDD hard to implement.

In general, there may be two kinds of CLI, firstly where an uplink of one base station is interfered by a downlink of another one, and, secondly, where a downlink of one UE is interfered by an uplink of another UE. This CLI arises at the cell edge, as in more internal parts of a cell, the base station controlling the cell will schedule UEs to avoid resource collisions. Methods to address UE CLI may be divided into methods relying on UEs on the one hand, and base station-driven methods on the other hand. A drawback of UE-driven methods is that UEs need to participate in them by monitoring spectrum and/or sending reference signals to indicate to other UEs that they intend to perform a transmission. Such methods consume UE battery resources and, in some cases, cause some interference in themselves. A base station-driven method is therefore herein preferred.

One way to address the problem of UE CLI is CLI management. Methods in this category consist of various kinds of coordination schemes between the neighboring cells. For example, neighboring base stations may schedule their respective users in such a manner to minimize or completely avoid CLI by delaying certain users and prioritizing others, conditioned on their respective loads. As another example, cells may use a hybrid transmission scheme in which the cell center uses a flexible TDD allocation, while the cell edge regions employ only static TDD.

Alternatively, CLI cancellation may be attempted, this group of solutions comprising methods to cancel or suppress the cross-link interference locally at the interfered UE, with the use of advanced detectors such as MMSE-IRC receivers, for example. Disadvantages of such solutions include that these methods require knowledge of the interfering link, and that they incur an increase in signaling overhead and computational complexity.

Figure 2:
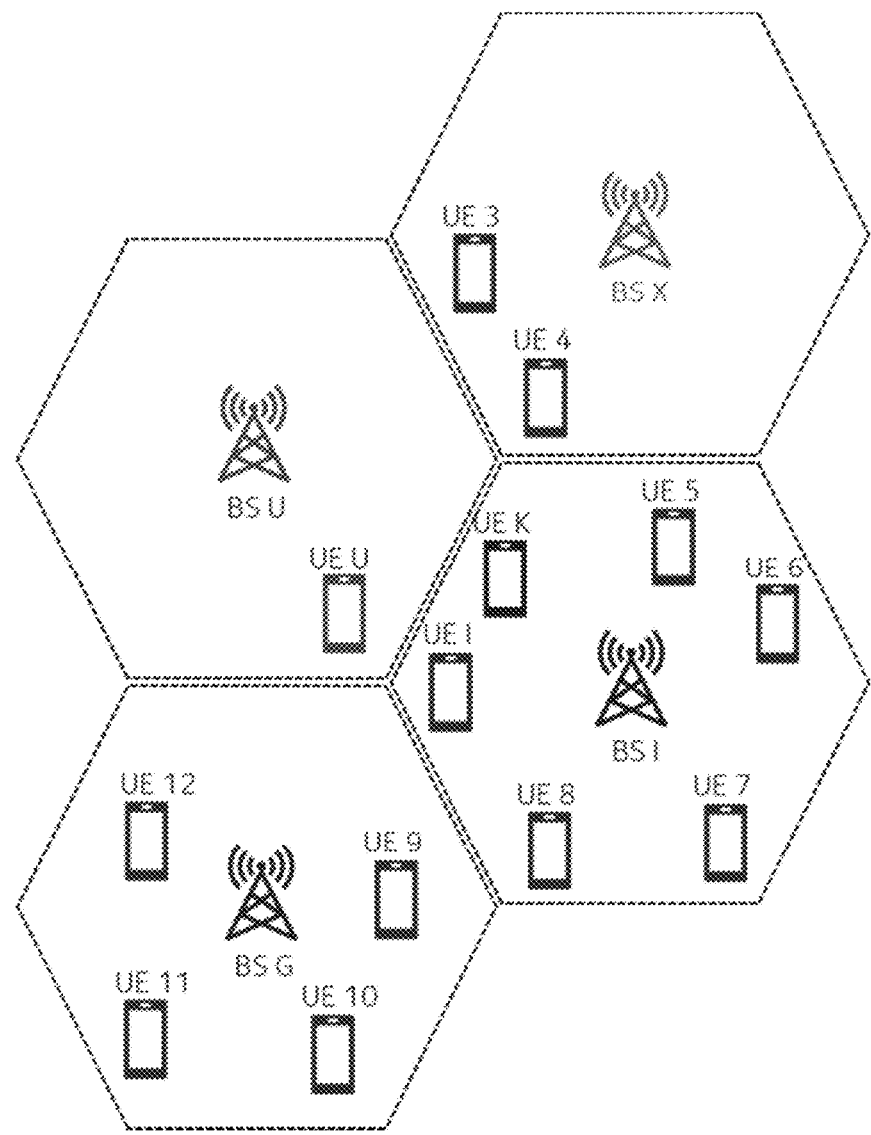
FIG. 2 illustrates an example system in accordance with at least some embodiments.

FIG. 2 illustrates an example in which an UE interfered by CLI, UE U, referred also to as a victim UE, served by a cell of a victim BS U. UEs UE K and UE I are interfering the UE U, and may also be referred to as aggressor UEs, served by cell of one or more aggressor BS s BS I. The BS U may instruct the UE U to perform measurements of other UEs to detect aggressor UEs. Lacking any other information, the UE U may need to measure 12 other UEs in neighbouring cells (also of BS G and BS X), to find out that only two of the UEs are in fact aggressors.

Figure 3:
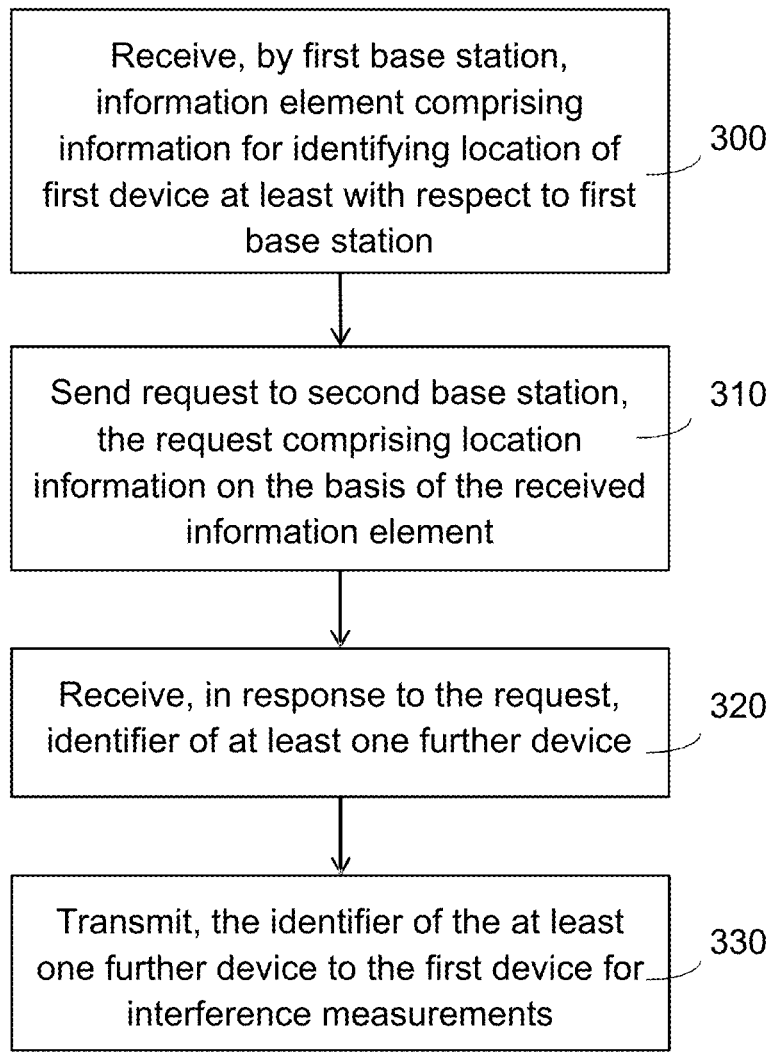
FIGS. 3 to 5 illustrate methods in accordance with at least some example embodiments.
Figure 4:
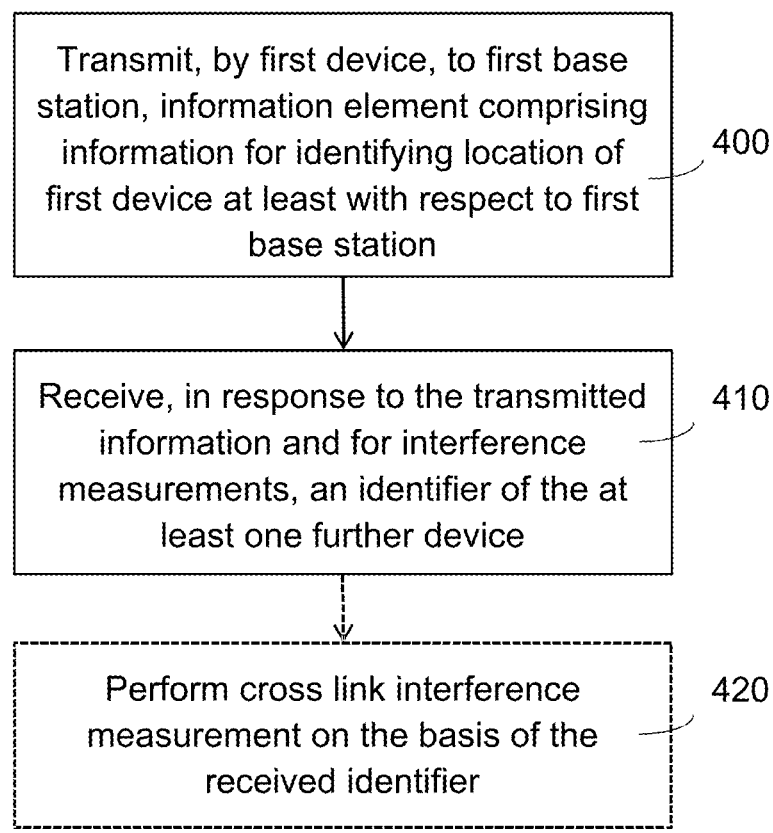

There is now provided an improved interference detection procedure for interference management, addressing identification and reporting of interfering user devices, and enabling to reduce computational and signalling cost at the user device side. Reference is made to FIGS. 3 and 4, illustrating methods for interference measurement management for a base station and a user device communicating with each other, respectively. The methods FIGS. 3 and 4 may be applied by an apparatus performing, or a controller of the base station (e.g. the base station 110, BS U) or user equipment (e.g. the UE 115, UE U), respectively.

A first base station, e.g. the BS U, receives 300 an information element comprising information for identifying location of a first device, e.g. the UE U, at least with respect to the first base station. Such information refers generally to information on the basis of which e.g. distance or some other parameter related to or dependent of the location of the first device with respect to at least the first base station may be identified or defined. Block 310 comprises sending a request to a second base station, e.g. the BS I, the request comprising location information on the basis of the received information element.

The location information is to be understood broadly to refer generally to information dependent on the location of the first device, but does not need to define the location of the first device. The location information may be obtained from the received information element or generated on the basis of the information element. The location information may be relative with respect to one or more base stations, such as the first and/or second base station. In one embodiment, the location information may comprise the geographical location of the UE. In this case the location information is not relative location with respect to a base station, but an "absolute" location information. Some further examples are illustrated below.

Block 320 comprises receiving, in response to the request, an identifier of at least one further device, e.g. the UE I, UE K. Block 330 comprises transmitting the identifier of the at least one further device to the first device for interference measurement.

In the method of FIG. 4, a first device transmits 400 to a first base station, an information element comprising information for identifying location of the first device at least with respect to the first base station. The first device receives 410, in response to the transmitted information and for interference measurements, an identifier of the at least one further device. FIG. 4 also further illustrates that the first device may then perform 420 CLI measurements of the further device(s) on the basis of the received identifier.

Figure 5:
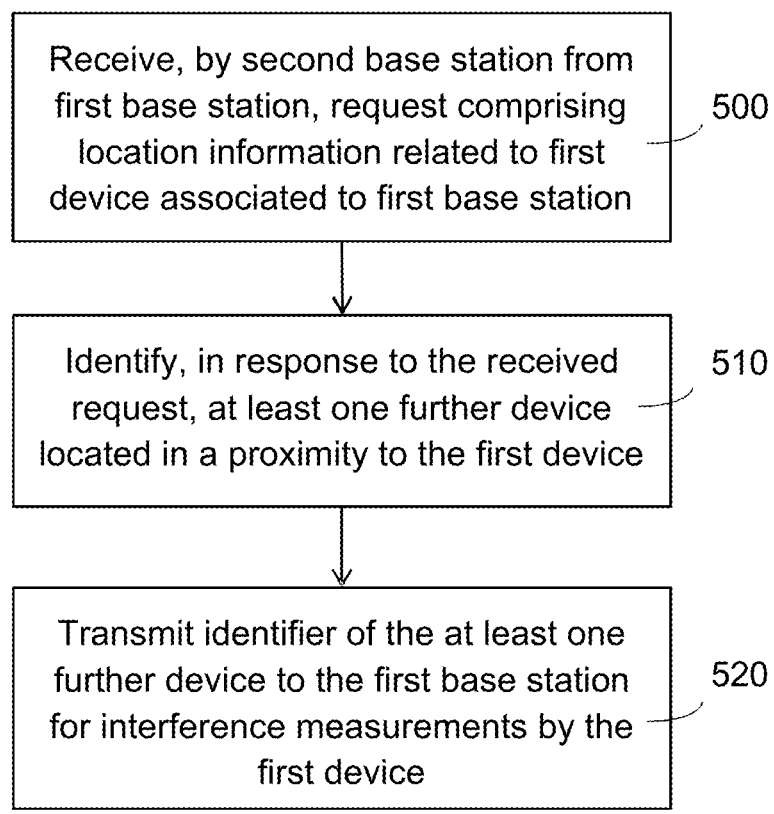

FIG. 5 illustrates a method for facilitating interference management and interfering device identification. The method may be applied by an apparatus performing, or a controller of a base station, such as the aggressor BS I, 110, which may communicate with the apparatus performing the method of FIG. 3.

The method comprises receiving 500, by a second base station from a first base station, a request comprising location information related to a first device associated to the first base station. Block 510 comprises identifying, in response to the received request, at least one further device located in a proximity to the first device. Block 520 comprises transmitting an identifier of the at least one further device to the first base station for interference measurements by the first device.

Thus, a list of aggressor UEs, which may be referred to also as a list of CLI-prone UEs, may be generated on the basis of co-operation of the base stations and applied for managing measurements at the victim UE, i.e. CLI-prone UE. Substantial computational and signalling cost savings are enabled due to limiting the interference measurement to only the aggressor UEs, which may reduce the number of UEs interference-measured by a cell-edge UE even by tens or hundreds.

The information element(s) from the first device in block 300, 400 may comprise at least one of:
- geographical location information of the first device,
- distance of the first device to the first base station,
- distance of the first device to at least one further base station,
- timing difference of the first device in relation to serving cell, and
- timing difference of the first device in relation to at least one neighboring cell.

In some embodiments, the identifying 510 of aggressor devices comprises using at least one of:
- geographical location information of the at least one further device,
- distance of the at least one further device to the second base station,
- distance of the at least one further device to at least one further base station,
- timing difference of the at least one further device in relation to its serving cell, and
- timing difference of the at least one further device in relation to at least one neighboring cell.

The timing difference (TD) may comprise any absolute or relative timing information of the first device UE with respect to one or more base stations. In non-limiting embodiments, the TD may comprise for example time offset or timing advance (TA) based on measurements of the first device. Additionally or alternatively, the TD can comprise a difference in UE Rx timings between signals of different base stations.

Figure 6:
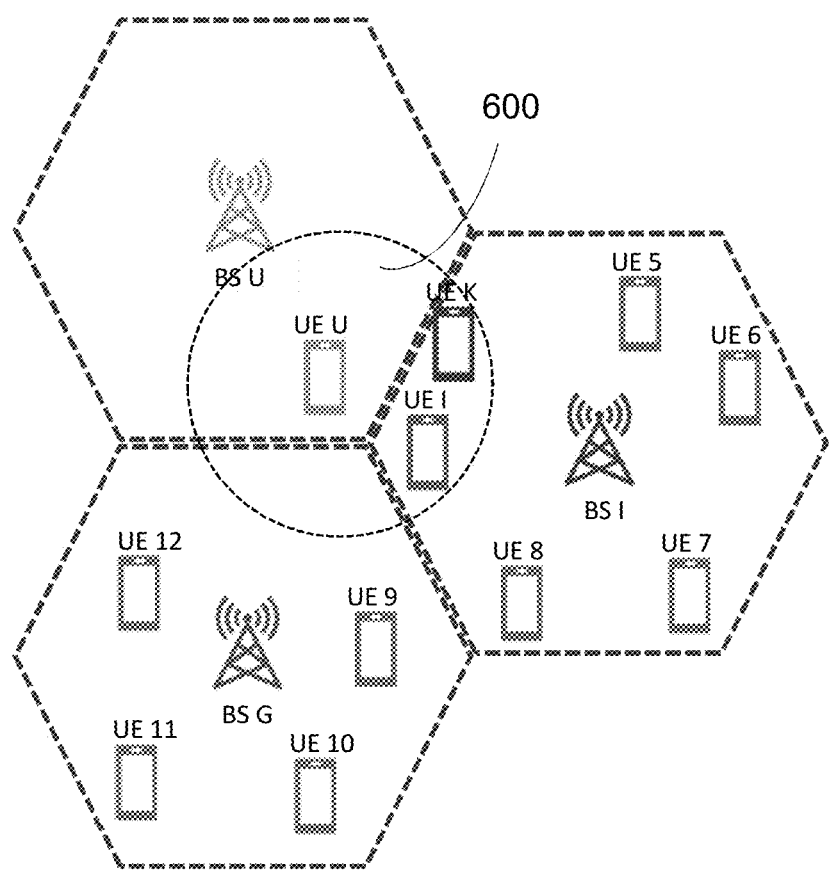
FIG. 6 illustrates hot zone identification in an example system.

With reference also to the example of FIG. 6, in some embodiments, a hot zone 600 is defined around the first device, in the below example embodiments the (victim) UE U. The hot zone refers generally to a geographical area around the UE U. The hot zone may be defined by the second base station on the basis of the information element from the UE U (blocks 300 and 400) as an additional block in FIG. 3.

The first base station may inform the second base station of the hot zone 600, on the basis of which the second base station identifies the user devices it is serving and are located in the hot zone. The location information in the request 310, 500 from the first base station, in the below examples the BS U, to the second base station, in the below examples the BS I, may thus comprise information identifying the hot zone 600. The hot zone may be defined and identified in various ways, some of which are illustrated below.

In one example, the hot zone may be identified by a distance from the UE U location. Thus, if BS U knows the location of UE U, the hot zone may be defined as a circle area with pre-defined radius around the UE. Alternatively, the hot zone may be defined based on distances and/or timing differences of the UE U to the BS U and one or more neighbouring base stations, e.g. the BS I. In an example embodiment, for defining the hot zone, BS U will, as an intermediate step, calculate the TA value(s) of the UE U to one or more base stations based on the obtained TD information. The hot zone may be identified based on the TA value(s).

In some embodiments, also the BS I defines the hot zone on the basis of received timing information. In a further example embodiment, the BS I calculates TA values on the basis of measurement reports from devices it is serving, UE I, UE K, to the BS I and BS U based on reports from these devices. The BS I may define the hot zone and/or define the aggressor devices within the hot zone on the basis of the TA values.

The request 310, 500 may comprise TA information defined on the basis of the timing difference information received at least from the UE U. The timing advance information may comprise minimum and maximum TA values for UEs to be identified and reported (in 510, 520, 320). However, it is to be appreciated that there are many other potential ways available to identify the hot zone for identifying the aggressor, depending e.g. on the applied input in the information element. For example, the request 310, 500 could comprise current location of the UE U and information on radius Δ or other parameter(s) defining reach or dimension of the hot zone 600.

Figure 7:
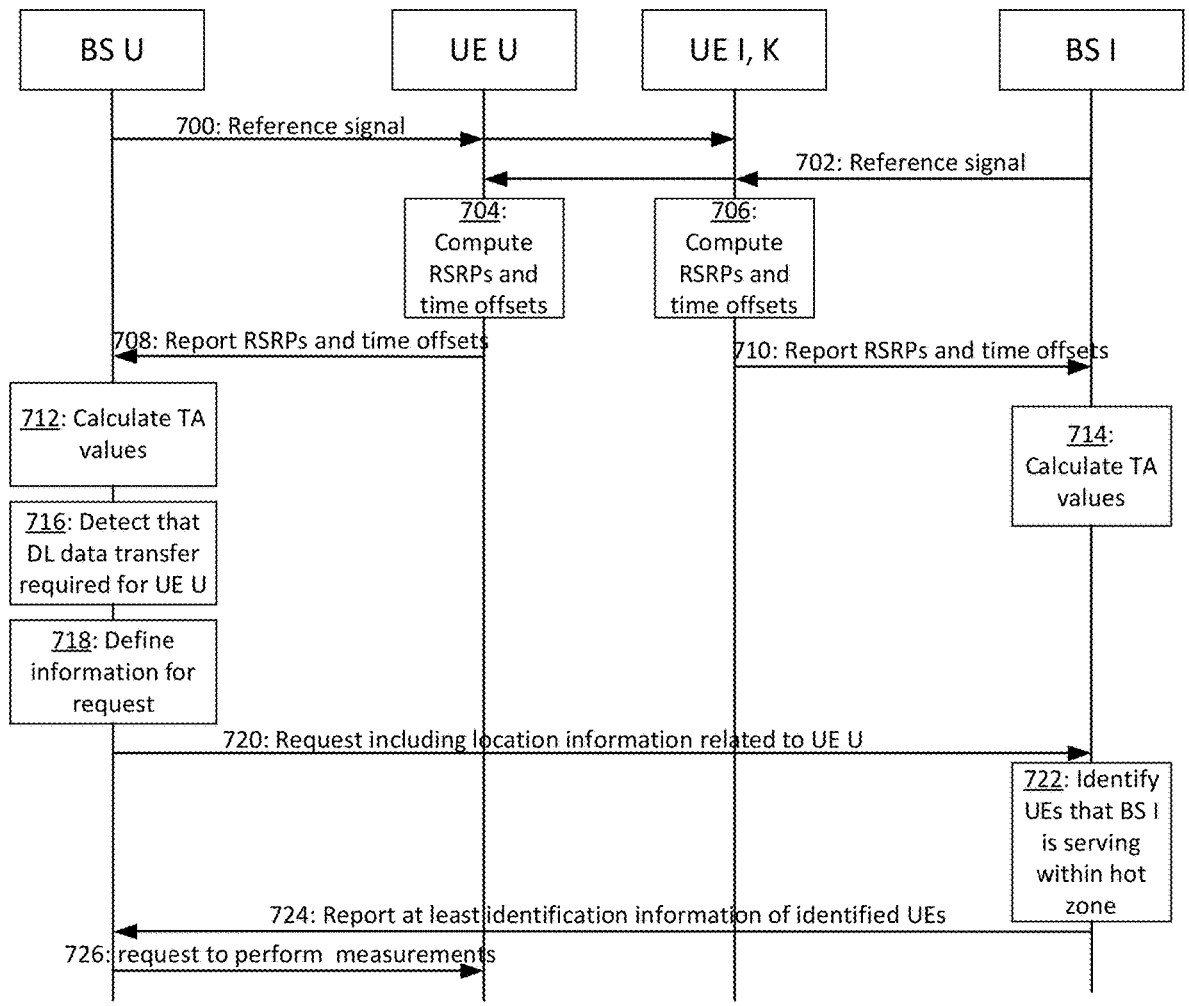
FIG. 7 illustrates signalling in accordance with at least some example embodiments.

FIG. 7 illustrates signalling between associated entities for interference measurement management. Devices UE U, UE I, and UE K measure reference signal 700 of BS U and reference signal 702 of BS I. They may compute 704, 706 their corresponding RSRPs and respective time offsets using traditional synchronization procedures.

For example, the computation yields for UE U that reference signal received power from BS U $RSRP_U$>$RSRP_I$ (RSRP from BS I). Thus, the UE U selects BS U as a serving base station and may further inform the BS U that BS I was the second-best candidate (can be one or more) by reporting 708 the RSRPs and the time offsets. Similarly, the UE I, K report 710 their measured RSRPs and time offsets to the BS I.

The UEs thus complete their cell search procedure. The BS U and the BS I may in 712 and 714 calculate TA values on the basis of the received reports. For example, the BS U calculates TAs from the time offsets received from the UE U (BS U measures on UL signals from the UE U and instructs the UE to adjust its TA based on this. Given the serving cell TA and the UE measured time offset for a neighbor cell, the BS U can calculate the corresponding TA for the neighbor cell). The base stations may generate lists of attached devices and their second-best BS preferences e.g. as:
  i. BS U:
    1. UE U attached to me with associated RSRP and timing advance information ($RSRP_{UU}$,$TA_{UU}$), wherein $_{UU}$ refers to UE U and BS U.
    2. UE U has BS I as second best with report ($RSRP_{UI}$, $TA_{UI}$), wherein $_{UI}$ refers to UE U and BS I.
  ii. BS I:
    1. UE I, K attached to me.
    2. UE I, K have BS U as the second best base station.

In this example, the BS U detects 716 that downlink data transfer is required for the UE U. Thus, the UE U is a potential CLI victim. The BS U defines and/or retrieves 718 information for the (aggressor device) request 720 to the BS I, the request comprising the location information related to the UE U, in some embodiments the information identifying the hot zone. The BS I identifies 722 UEs that it is serving and are within the UE U hot zone and reports 724 at least identification information of such UEs to the BS U. The BS U then requests or instructs 726 the UE U to perform measurements of the UEs reported by the BS I.

In some embodiments, the request 310, 500, 720 to the second base station BS I is a request for sounding reference signal (SRS) configuration. The identifiers of the aggressor device(s) may then be received in an SRS report.

In an embodiment, the BS U computes in 718 TA limit information, which is included in the location information of the request 720. The BS U may generate the request 720 to cause the neighbor BS I to identify 722 and report 724 the SRS configuration of all its users within the CLI hot-zone of UE U with the radius $\Delta$, i.e. in the present example the devices $x \in \{I, K\}$ for which:
  i. $TA_{UU} - \Delta \leq TA_{xU} \leq TA_{UU} + \Delta$, and
  ii. $TA_{UI} - \Delta \leq TA_{xI} \leq TA_{UI} + \Delta$.

Figure 8A:
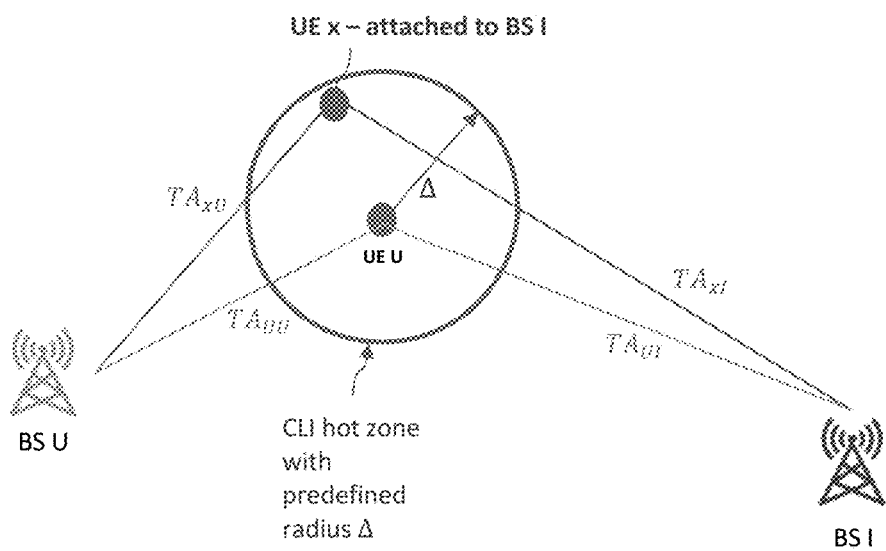
FIGS. 8a to 8c illustrate hot zone identification examples in accordance with at least some example embodiments.
Figure 8B:
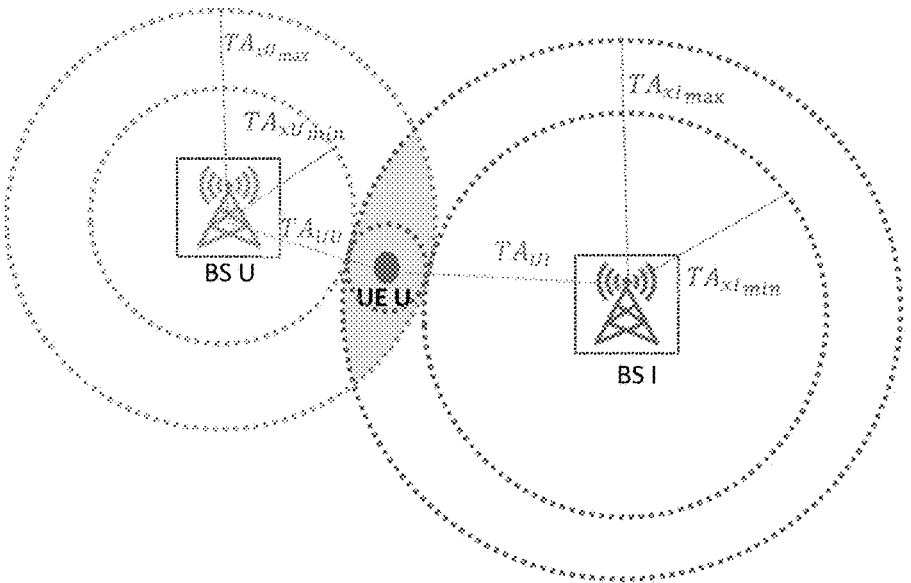

FIG. 8a further illustrates an example in which the UE U can see both the BS U and BS I, and UE x attached to the BS I can see both the BS U and BS I, with associated TAs. FIG. 8b illustrates, for the UE U hot zone, the minimum and maximum TA values for BS U ($TA_{xU}$) and BS I ($TA_{xI}$).

Figure 8C:
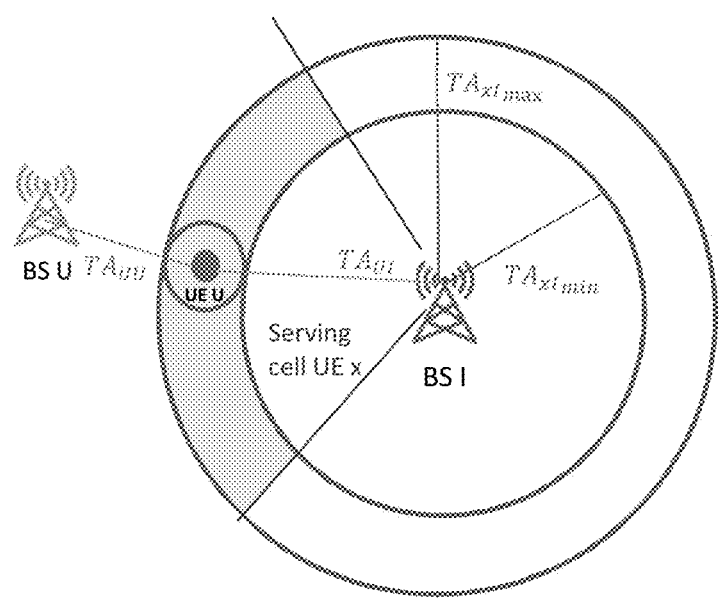

If the UE x cannot see the BS U, the situation reduces to above ii, whereby the BS U may generate the request 720 to cause the neighbor BS I to report the SRS configuration of all its users within the CLI hot-zone of UE U for which: $TA_{UI} - \Delta \leq TA_{xI} \leq TA_{UI} + \Delta$. Such selection is illustrated in FIG. 8c. As further illustrated, the BS may apply segmented configuration and apply the present features for the respective segment.

At least some of the blocks of FIGS. 3 to 5 and further embodiments thereof may be repeated periodically and/or due to an event. The aggressor identification illustrated above e.g. in connection with FIG. 3 may be triggered by various events, such as where the base station itself begins to serve a new UE, a determination, for example based on timing, that a UE served by the base station has moved to a cell edge, or a determination that a UE has moved to another sector, that is, left a current beam of the base station.

In some embodiments, at least some of the blocks of FIGS. 3 to 5 and further embodiments thereof are repeated due to movement of the victim UE (UE U) or at least one aggressor UE (UE I, K). The hot zone 600 may be updated in the BS U in response to detecting the movement of the UE U. Thus, the list of aggressor UEs may be updated on the basis of the updated hot zone by applying blocks 310, 320, 500-530. A CLI measurement request may be sent to the UE U with identifiers of devices associated with the second base station and/or further base stations and defined on the basis of the updated hot zone.

Figure 9A:
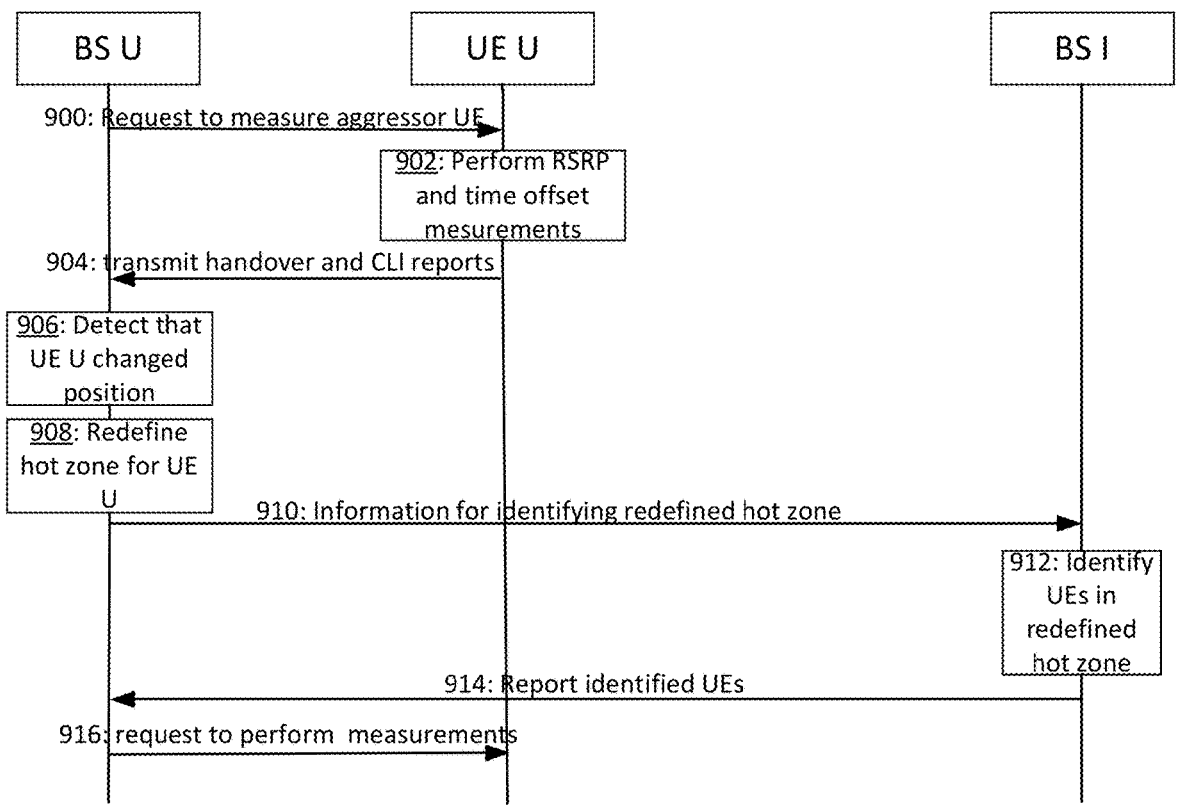
FIGS. 9a and 9b illustrate signalling in accordance with at least some example embodiments.
Figure 9B:
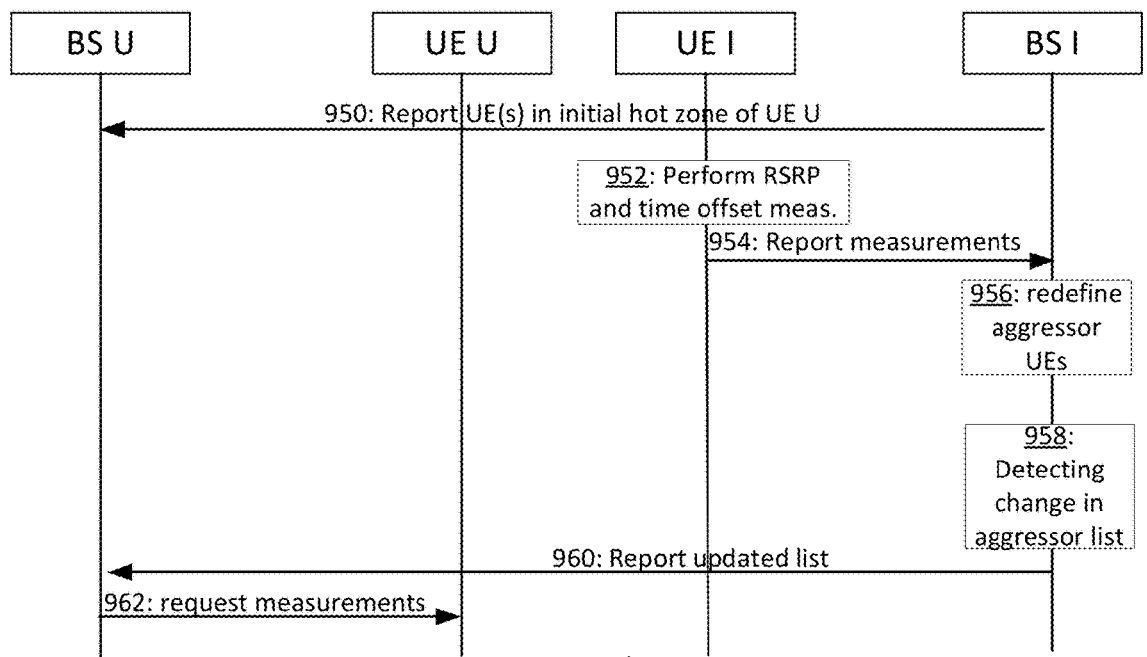

Event-based CLI hot-zone updates in connected mode are illustrated in FIGS. 9a and 9b for case of a victim UE and aggressor UE movement, respectively. The two example procedures may be based on existing handover (HO) procedures and trigger additional processing at the BS U to refine the CLI hot-zone and additional signaling between the base stations to refine the potential aggressor list in the updated CLI zone.

The BS U requests 900 the victim UE U to measure the aggressor UE I attached to cell of the BS I (after applying at least some features illustrated above). The UE U may perform 902 continuous RSRP and time offset measurements for CLI and handover measurement purposes and transmit 904 handover and CLI (hot-zone) reports to its serving BS U.

In FIG. 9a, the BS U detects 906 that the UE U has changed position. The BS U may decide position change for the UE U on the basis of processing of reported RSRP and TA values and associated threshold values. In response to 906, the BS U redefines 908 the hot zone for the UE U. The recomputation may apply the same or similar processing as illustrated above in connection with FIGS. 8a-c, for example.

Information for identifying the redefined hot zone is sent 910 to the BS I. In an embodiment, the BS U may send a request for SRS information of UEs comprising TA limits recalculated at 908. In response to 910, the BS I identifies 912 the UE(s) in the redefined hot zone and reports 914 them to the BS U. For example, a new UE, UE P, may be identified in the redefined hot zone, whereby the SRS configuration of the UE P may be included in the report 914. The BS U then requests or instructs 916 the UE U to perform measurements of the UE(s) reported by the BS I.

In FIG. 9b, the BS I initially reports 950 UE(s) within the initial hot zone of the UE U, in the example at least the UE I. The UE I may perform 952 continuous RSRP and time offset measurements and report 954 them to its serving BS I. The measurements and reports may be both for CLI and handover measurement purposes.

As a CLI management related operation, in response to detecting movement of the aggressor UE I, the BS I redefines or re-identifies 956 the aggressor UEs in the most recently identified UE U hot zone, i.e. updates the potential aggressor list. In response to the update or detecting 958 a change in the aggressor list, the BS I reports 960 a new or updated list to the BS U. The BS U then requests or instructs 962 the UE U to perform measurements of the UE(s) (indicates at least the changes) newly reported by the BS I.

For the UEs identified to be inside the hot zone 600, these UEs may be tagged in as CLI-prone and a CLI matrix may be populated with their IDs. There may be also further information, such as information on physical resources the BS U intends to use to initiate DL and UL to its users.

The aggressor UE information, e.g. in a form or a CLI matrix, may be transmitted between gNBs through Xn interface. Inter-base station signalling of the CLI matrix may be included in the Served Cell Information NR IE, which is carried by the Xn Setup and NG-RAN Node Configuration Update procedures. Alternatively, it may be included in a load information procedure.

The CLI matrix information could be expressed, for example, in the following format: A list of UE IDs (e.g. C-RNTIs) that the gNB sending the CLI matrix is currently serving and which are subject to CLI with UEs served by the gNB that is receiving the CLI matrix. For each of the UEs, the anticipated physical resources where it will most likely be scheduled for UL and DL may be also provided, as well as a list of UE IDs from the receiving base station cells that are subject to potential UE-CLI with it In an embodiment, the base stations may exchange information for detecting CLI-prone UEs before triggering CLI management and measurements. For example, gNBs may exchange information of the UEs that they are serving and their corresponding SRS configurations. This could be implemented as a list of UE IDs, such as C-RNTI, and their SRS configurations.

In an example embodiment, the serving gNBs exchange information about CLI-prone UEs and compute their geometric proximity before triggering CLI-measurements and other CLI management techniques.

Figure 10A:
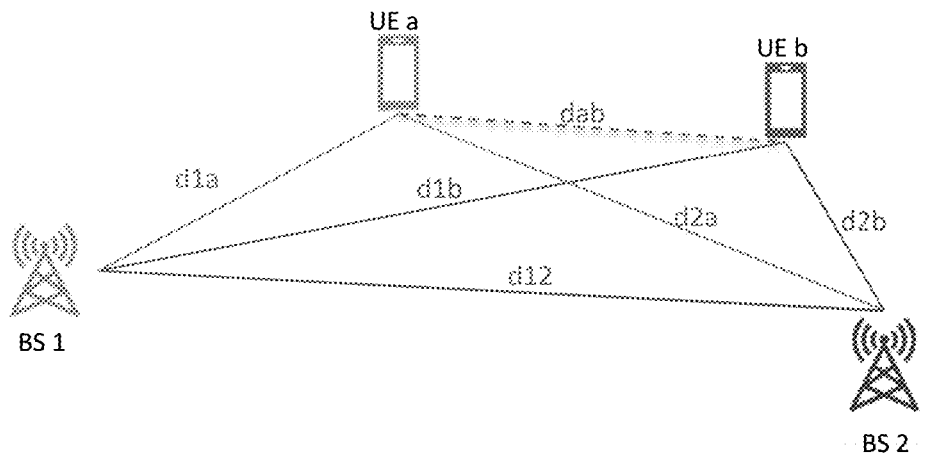
FIGS. 10a and 10b illustrate distance definition between example system elements.

An example scenario is illustrated in FIG. 10a, wherein UE a and UE b see base stations BS 1 and BS 2, indicating distances between the respective entities. The below actions may be carried out for CLI measurement control:
  1. UE a may report to its preferred BS, i.e. the BS 1:
     RSRP 1a, distance derived from time-advance info: d1a
     RSRP 2a, d2a (BS 2 is the second best base station)

Figure 10B:
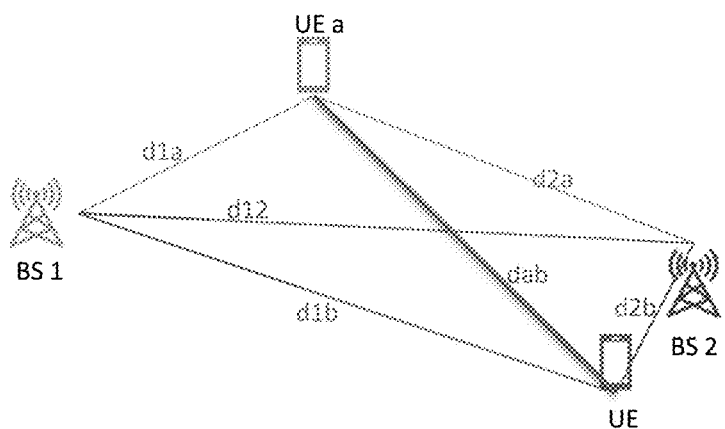

2. UE b may report to its preferred BS, i.e. the BS 2:
   RSRP 2b, d2b
   RSRP 1b, d1b (BS 1 is the second best)
3. BS 1 and BS 2 may check if any of its served UEs are CLI-prone. A base station may define any UE attached to itself and located at its cell edge as CLI-prone UE.
4. BS 1 and BS 2 exchange the lists of potential CLI-prone UEs obtained above. BS 1 knows now that the UE b is near its edge and can be CLI-aggressor. Similarly, BS 2 knows now that UE a is near its edge and can be CLI-aggressor. Additionally, BS 1 and BS 2 also know d12.
5. UE a needs DL data transfer, therefore it becomes a potential CLI victim. BS 1 needs to find out how far UE b is from UE a before triggering CLI measurements at the UE a.
6. BS 1 computes the relative distance between these users, i.e. dab. Solving the geometric problem for dab may yield a double solution, therefore BS 1 knows that UE a and UE b can be positioned as in FIG. 10*a* or 10*b*. If min{dab}<predefined threshold, then BS 1 can initiate the CLI management procedure.

Figure 11:
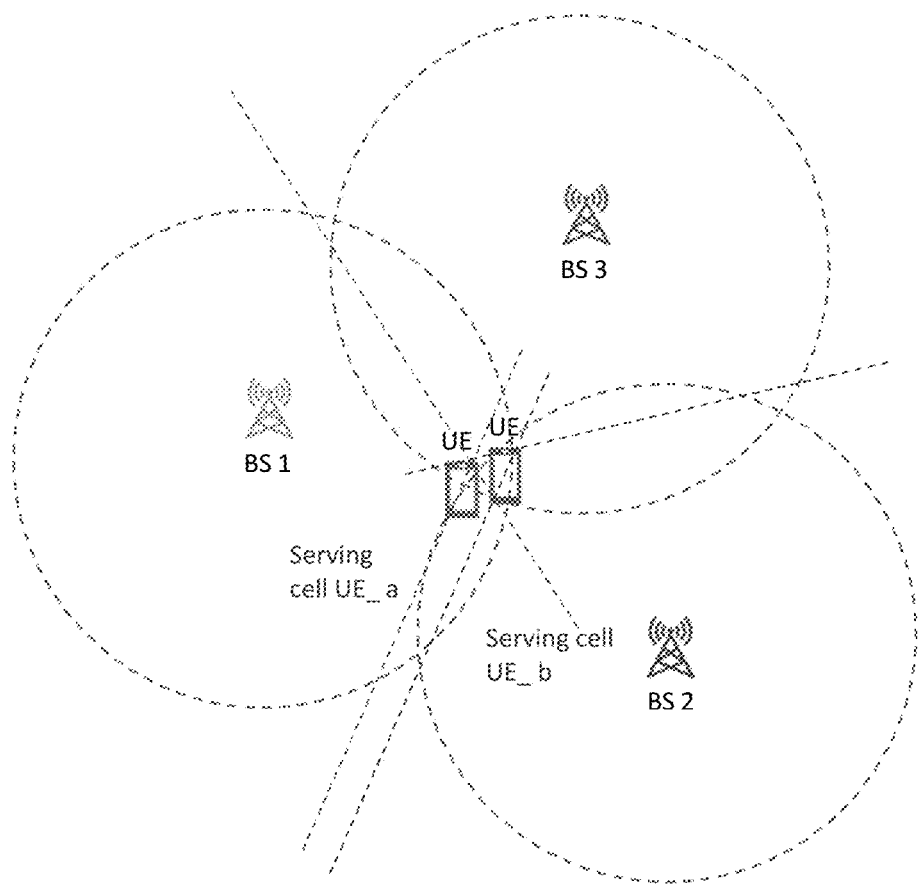
FIG. 11 illustrates hot zone identification in an example system.

With reference to FIG. 11, in the event that the UEs in above example can see at least two other neighbour base stations, the relative physical distance between aggressor UE a and victim UE b can be uniquely calculated by triangulation. This again leads to the most accurate down selection of potential aggressors to sound within the defined victim UE CLI hot zone.

In a still further example embodiment, a serving base station can further restrict the set of requested CLI aggressors by introducing one or more additional conditions for the request 310, 500, such as an RSRP condition indicated in the request. For example, in addition to the TA limitations i) and ii) illustrated earlier, also an RSRP restriction may need to be fulfilled:

$$\frac{RSRP_{xU}}{RSRP_{xI}} \in \left[\frac{RSRP_{UU}}{RSRP_{UI}} - \delta, \frac{RSRP_{UU}}{RSRP_{UI}} + \delta\right].$$

This ensures that the victim UE U and aggressor UE x receive similar power levels from the victim BS U and aggressor BS I.

At least some of the above-illustrated information exchange may be configured to be event triggered, so such information e.g. is exchanged whenever a gNB starts serving a new UE, a new call is initiated, or a UE coming to the gNB as result of a handover. Similarly, when a gNB stops serving a UE that it has earlier informed a neighbouring gNB about, it may inform that this UE is no longer served such that it does not attempt to measure signals from it. For example, at least some of the above-indicated new information between gNBs may be included as part of the Served Cell Information NR IE, which is carried by the Xn Setup and NG-RAN Node Configuration Update procedures.

The base station may be a distributed base station, such as an NR intra-gNB architecture with F1 interface between the CU and DUs. At least some of the above-illustrated features for the first base station and second base station may be implemented in distributed base station elements. In such a setting, the CU may be configured to identify or control computing of which UEs are in same hot-zones on the basis of (the location) information provided by connected DUs. The CU may also be configured to configure such identified UEs with proper parameters for UE CLI measurements. This may be provided by a radio resource control (RRC) entity in the CU. UE RSRP and UE time-offset measurements may be reported to the RRC entity as RRM events in RRC messages. In addition, the CU would need to know the TA that the serving cell DUs use for their RRC connected mode UEs. The TA information may be made available at the CU by introducing signalling of UEs TA values from the DU to CU on the F1 interface. There is no need of exchange of CLI list between network components for the CU-DU architecture as this will then be centrally available at the CU.

Figure 12:
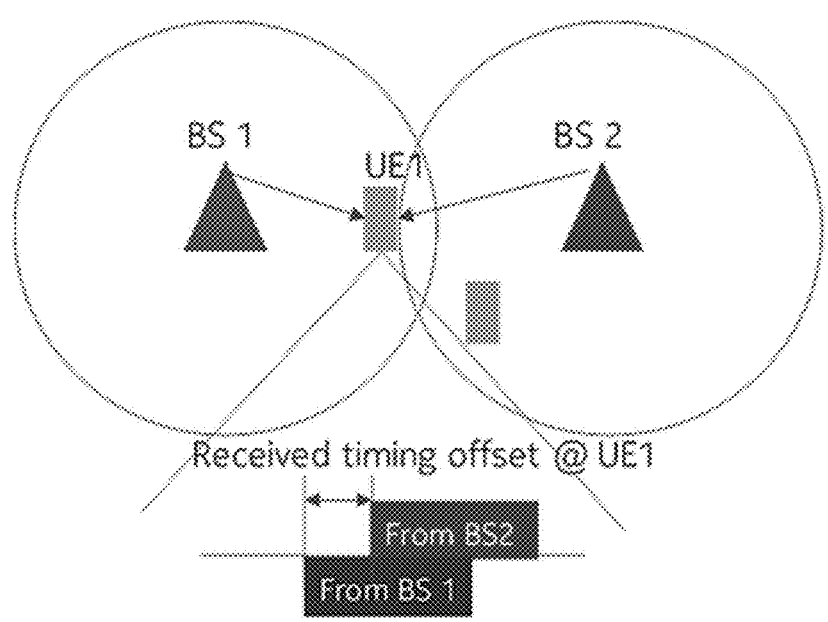
FIG. 12 illustrates received signal timing difference for user equipment at cell edge area.

With reference to example of FIG. 12, timing difference indicative of difference of timing of a signal received from the first base station BS 1 and timing of a signal from the second base station BS 2 at a receiver of the first device UE 1 may be defined. In response to detecting that the timing difference is smaller than a pre-configured threshold value, interference measurements by the first device may be triggered. In an example embodiment, the UE U may trigger interference measurements itself. Thus, if the difference in timing of the received signal from the serving base station and from at least one other base station is less than a pre-configured threshold, the UE may perform the interference measurements. Alternatively, or in addition, the BS U may trigger the interference measurement by the UE U based on the comparison of the timing difference to the threshold, based on the measurement reports from the UE U. In a still further example embodiment, the UE U may transmit (400) to the serving base station the information element for identifying the UE's location in response to detecting the difference of Rx signal timing to be below a pre-configured threshold.

Figure 13:
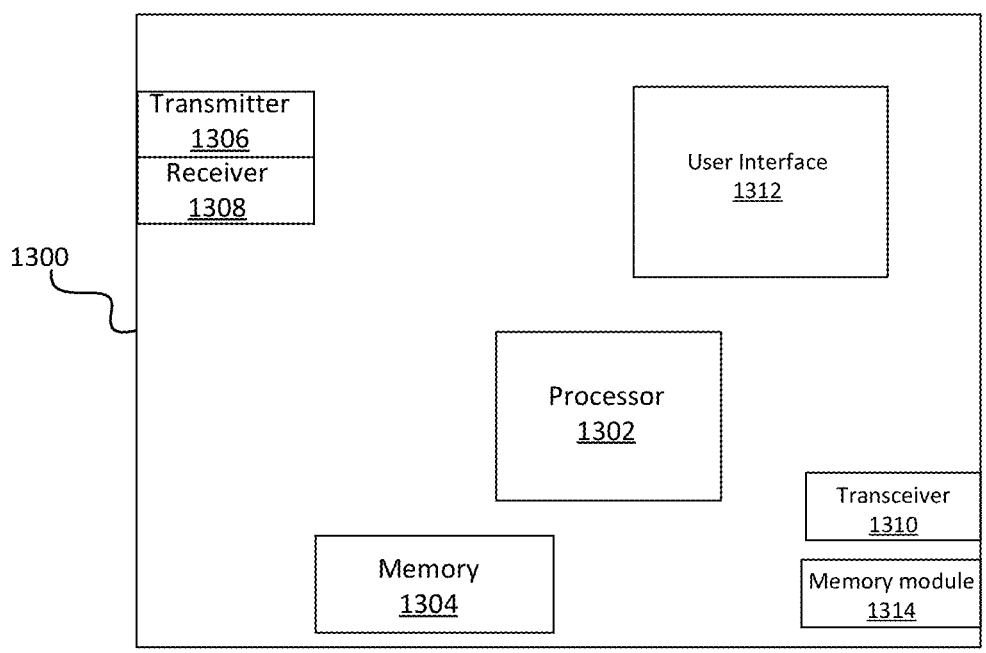
FIG. 13 illustrates an apparatus in accordance with at least some example embodiments.

FIG. 13 illustrates an example apparatus capable of supporting at least some embodiments of the present invention. Illustrated is a device 1300, which may comprise a communications device arranged to operate as the first device (e.g. UE U), the first base station (e.g. the BS U), or the second base station (e.g. the BS U), for example. The device may include one or more controllers configured to carry out operations in accordance with at least some of the embodiments illustrated above, such as some or more of the features illustrated above in connection with FIGS. 3 to 12. The device may be configured to operate as the apparatus configured to carry out the method of FIGS. 3 and/or 5, for example.

Comprised in the device 1300 is a processor 1302, which may comprise, for example, a single- or multi-core processor wherein a single-core processor comprises one processing core and a multi-core processor comprises more than one processing core. The processor 1302 may comprise in general, a control device. The processor 1302 may comprise more than one processor. The processor may comprise in general, a control device. The processor may comprise at least one field-programmable gate array, FPGA. The processor may be means for performing method steps in the device. The processor may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The device 1300 may comprise memory 1304. The memory may comprise random-access memory and/or permanent memory. The memory may comprise at least one RAM chip. The memory may comprise solid-state, magnetic, optical and/or holographic memory, for example. The memory may be at least in part accessible to the processor 1302. The memory may be at least in part comprised in the processor 1302. The memory 1304 may be means for storing information.

The memory 1304 may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 1300 but accessible to the device. For example, control parameters affecting operations related to interference measurement management and/or providing CLI management related information may be stored in one or more portions of the memory and used to control operation of the apparatus. Further, the memory may comprise device-specific cryptographic information, such as secret and public key of the device 1300.

The device 1300 may comprise a transmitter 1306. The device may comprise a receiver 1308. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 5G or other cellular communications systems, WLAN, and/or Ethernet standards, for example. The device 1300 may comprise a near-field communication, NFC, transceiver 1310. The NFC transceiver may support at least one NFC technology, such as NFC, Bluetooth, Wibree or similar technologies.

The device 1300 may comprise user interface, UI, 1312. The UI may comprise at least one of a display, a keyboard, a touchscreen, a vibrator arranged to signal to a user by causing the device to vibrate, a speaker and a microphone. A user may be able to operate the device 1300 via the UI, for example to configure network operations.

The device 1300 may comprise or be arranged to accept a user identity module or other type of memory module 1314. The user identity module may comprise, for example, a subscriber identity module, SIM, and/or a personal identification IC card installable in the device 1300.

The processor 1302 may be furnished with a transmitter arranged to output information from the processor, via electrical leads internal to the device 1300, to other devices comprised in the device. Such a transmitter may comprise a serial bus transmitter arranged to, for example, output information via at least one electrical lead to memory 1304 for storage therein. Alternatively to a serial bus, the transmitter may comprise a parallel bus transmitter. Likewise the processor may comprise a receiver arranged to receive information in the processor, via electrical leads internal to the device 1300, from other devices comprised in the device 1300. Such a receiver may comprise a serial bus receiver arranged to, for example, receive information via at least one electrical lead from the receiver 1308 for processing in the processor. Alternatively to a serial bus, the receiver may comprise a parallel bus receiver.

The device 1300 may comprise further devices not illustrated in FIG. 13. In some embodiments, the device lacks at least one device described above. For example, some devices may lack the NFC transceiver 1310 and/or the user identity module 1314.

The processor 1302, the memory 1304, the transmitter 1306, the receiver 1308, the NFC transceiver 1310, the UI 1312 and/or the user identity module 1314 may be interconnected by electrical leads internal to the device 1300 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the example embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular example embodiments only and is not intended to be limiting.

Reference throughout this specification to one embodiment or an example embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various example embodiments and example of the present invention may be referred to herein along with alternatives for the various components thereof. It is understood that such example embodiments, examples, and alternatives are not to be construed as de facto equivalents of one another, but are to be considered as separate and autonomous representations of the present invention.

Furthermore, the described features, structures, or characteristics may be combined in any suitable manner in one or more example embodiments. In the preceding description, numerous specific details are provided, such as examples of lengths, widths, shapes, etc., to provide a thorough understanding of example embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

The invention claimed is:

1. An apparatus comprising at least one processor, at least one memory including computer program code, the at least one memory and the computer program code being configured to, with the at least one processor, cause the apparatus at least to:
   receive an information element comprising information for identifying location of a first device at least with respect to the apparatus;
   send a request to a base station, the request comprising location information on the basis of the received information element;
   receive, in response to the request, an identifier of at least one further device; and
   transmit the identifier of the at least one further device to the first device for interference measurements.

2. The apparatus according to claim 1, wherein the apparatus is configured to send the request to the base station further in response to detecting need for downlink data transfer to the first device and the base station being identified in a network cell list received from the first device.

3. The apparatus according to claim 1, wherein the request to the base station is a request for sounding reference signal configuration, the identifier of the at least one further device is received in a sounding reference signal report.

4. An apparatus comprising at least one processor, at least one memory including computer program code, the at least one memory and the computer program code being configured to, with the at least one processor, cause the apparatus at least to:
   transmit, to a first base station, an information element comprising information for identifying location of the apparatus at least with respect to the first base station; and
   receive, in response to the transmitted information and for interference measurements, an identifier of at least one further device.

5. The apparatus according to claim 4, wherein the apparatus is configured to perform cross link interference measurement of the at least one further device associated to a second base station.

6. The apparatus according to claim 4, wherein the identifier of the at least one further device for interference measurements is comprised in a cross-link measurement request to the apparatus.

7. The apparatus according to claim 4, wherein the information element comprises information for identifying location of the apparatus with respect to the second base station.

8. The apparatus according to claim 4, wherein the at least one further device is served by a cell, which is a neighboring cell to a serving cell of the first base station.

9. The apparatus according to claim 4, wherein the identifier of the at least one further device is included in a list of potential aggressors for the apparatus.

10. The apparatus according to claim 4, wherein the information element comprises at least one of:
    a geographical location information of the apparatus,
    a distance of the apparatus to the first base station,
    a distance of the apparatus to at least one further base station,
    a timing difference of the apparatus in relation to serving cell, or
    a timing difference of the apparatus in relation to at least one neighboring cell.

11. The apparatus according to claim 10, wherein the timing difference comprises at least one of a time offset or a timing advance.

12. The apparatus according to claim 4, wherein the at least one further device is located in a hot zone defined around the apparatus on the basis of the information element.

13. The apparatus according to claim 12, wherein the hot zone is defined based on timing difference of the apparatus to serving cell and to at least one neighbor cell.

14. The apparatus according to claim 12, wherein the location information in the request comprises information identifying the hot zone.

15. The apparatus according to claim 12, wherein the hot zone is updated in response to movement of the apparatus or the at least one further device, and a cross link interference measurement request is received as the apparatus with identifiers of devices associated with the second base station and/or further base stations and defined on the basis of the updated hot zone.

16. The apparatus according to claim 4, wherein the apparatus is configured to trigger interference measurements by the apparatus in response to detecting that estimated timing difference is smaller than a pre-configured threshold, wherein the estimated timing difference is indicative of difference of timing of a signal received from the first base station and timing of a signal from the second base station at a receiver of the apparatus.

17. An apparatus comprising at least one processor, at least one memory including computer program code, the at least one memory and the computer program code being configured to, with the at least one processor, cause the apparatus at least to:

receive, from a base station, a request comprising location information related to a first device associated to the base station;

identify, in response to the received request, at least one further device located in a proximity to the first device; and transmit an identifier of the at least one further device to the base station for interference measurements by the first device.

18. The apparatus according to claim 17, wherein the apparatus is configured to identify the at least one further device on the basis of information in the request identifying a hot zone around the first device and timing advances of devices attached to the apparatus.

19. The apparatus according to claim 18, wherein the timing advances of devices attached to the apparatus comprise timing advances of said devices to the apparatus and/or to the first base station.

20. The apparatus according to claim 17, wherein identifying the at least one further device comprises using at least one of:

a geographical location information of the at least one further device, a distance of the at least one further device to the apparatus, a distance of the at least one further device to at least one further base station, a timing difference of the at least one further device in relation to its serving cell, or a timing difference of the at least one further device in relation to at least one neighboring cell.

\* \* \* \* \*